United States Patent
Berneth et al.

(10) Patent No.: US 6,466,355 B1
(45) Date of Patent: Oct. 15, 2002

(54) UV PROTECTED ELECTROCHROMIC DEVICE

(75) Inventors: Horst Berneth; Daniel-Gordon Duff, both of Leverkusen; Werner Hoheisel, Köln, all of (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/581,395
(22) PCT Filed: Dec. 8, 1998
(86) PCT No.: PCT/EP98/07976
§ 371 (c)(1), (2), (4) Date: Jun. 13, 2000
(87) PCT Pub. No.: WO99/32574
PCT Pub. Date: Jul. 1, 1999

(30) Foreign Application Priority Data

Dec. 19, 1997 (DE) .......... 197 56 740

(51) Int. Cl.⁷ .......... G02F 1/15; G02F 1/153; G01N 21/00
(52) U.S. Cl. .......... 359/265; 359/273; 356/441; 252/582
(58) Field of Search .......... 359/265, 273, 359/296, 452; 356/441; 252/582, 583; 544/347; 546/257

(56) References Cited

U.S. PATENT DOCUMENTS

| | | | |
|---|---|---|---|
| 3,280,701 A | 10/1966 | Donnelly et al. | 88/77 |
| 4,902,108 A | 2/1990 | Byker | 350/357 |
| 5,128,267 A | 7/1992 | Köcher et al. | 436/92 |
| 5,140,455 A | 8/1992 | Varaprasad et al. | 359/275 |
| 5,280,380 A | 1/1994 | Byker | 359/265 |
| 5,472,477 A | 12/1995 | König | 75/343 |
| 5,618,872 A | * 4/1997 | Pohl et al. | 524/430 |
| 6,248,263 B1 | * 6/2001 | Tonar et al. | 252/583 |

FOREIGN PATENT DOCUMENTS

| | | |
|---|---|---|
| DE | 39 17 323 | 11/1990 |
| DE | 44 35 211 | 4/1995 |
| DE | 196 31 728 | 2/1998 |
| EP | 435689 | 7/1991 |
| EP | 476456 | 9/1991 |
| EP | 476457 | 9/1991 |
| EP | 628303 | 12/1994 |

OTHER PUBLICATIONS

D. Theis, Ullmann's Encyclopaedia of Industrial Chemistry, vol. A8, pp. 621–623, (month unavailable) 1987, "Electromechanical Displays".

Elektrokhimiya, pp. 24–28 (Translated from Elektrokhimiya, vol. 13, No. 1, pp. 32–37, Jan. 1977) Shelepin et al, "Electrochromism of Organic Compounds I. Electrochemical and Spectral Properties of a System Based on Methylviologen and 3–Ethyl–2–Benzothiazolone Azine".

Elekrtokhimiya, (month unavailable) pp. 404–408, (Translated from Elektrokhimiya, vol. 13, No. 4, pp 474–478, Apr. 1977), O. S. Abramzon et al, "Moisture–Exchange Process in Hydrogen–Oxygen Cells with Capillary Membrane III. Nonstationary Processes During Load Connection".

(List continued on next page.)

Primary Examiner—Georgia Epps
Assistant Examiner—Tim Thompson
(74) Attorney, Agent, or Firm—Joseph C. Gil; Richard E.L. Henderson (57) ABSTRACT

This invention relates to electrochromic devices that are protected against UV light by nanoparticles.

23 Claims, 1 Drawing Sheet

OTHER PUBLICATIONS

Elektrokhimiya, pp. 271–274 (Translated from Elektrokhimiya, vol. 14, No. 2, pp. 319–322, Feb., 1978, O. A. Ushakov et al, "Electrochromism of Organic Compounds Some Properties Of Two–Electrode Cells",.

Absorption and Scattering By A Sphere, pp. 93–104, (month unavailable), 1983, "The Internal and Scattered Fields".

J. Phys. Chem, (month unavailable) 1993, 97, pp. 1224–1230, K. A. Littau, et al "A Luminescent Silicon Nanocrystal Colloid via a High–Temperature Aerosol Reaction".

J. Vac. Sci. Technol. A 10(4), Jul./Aug. 1992, pp. 1048–1052, J. L. Dorier et al "Powder Dynamics In Very High Frequency Silane Plasmas".

Int. J. Heat Mass Transfer, vol. 31, No. 11, (month unavailable), 1988, pp. 2239–2249, I. S. Akmandor et al, "Heat and Momentum Transfer In Laser Induced Decomposition Of Silane Jets: Theory and Experiments".

NanoStructured Materials, vol. 6, (month unavailable), 1995, pp. 493–496, J. Dutta et al, "Crystallization Of Amorphous Nano–Sized Silicon Powders".

Topics in Current Chemistry, vol. 92, (month unavailable), 1980, pp. 1–44, S. Hünig et al "Two Step Reversible Redox Systems of the Weitz Type".

Angew. Chem., 90, (month unavailable), 1978, pp. 927–938, V. K. Deuchert et al "Mehrstufige Organische Redoxsysteme–ein Allgemeines Strukturprinzip".

Adv. Mater., 3, (month unavailable), 1991, No. 5, pp. 225–236, S. Hünig et al, "DCNQIs–New Electron Acceptors For Charge–Transfer Complexes and Highly Conducting Radical Anion Salts".

J. Am. Chem. Soc, (month unavailable), 1995, 117, pp. 8528–8535, G. V. Tormos et al, "Dithiadiazafulvalences–New Strong Electron Donors. Synthesis, Isolation, Properties, and EPR Studies".

J. Chem. Soc. Perkin Trans., 2, (month unavailable), 1990, pp. 1777–1783, M. R. Bryce et al, "Synthesis and Redox Behaviour of Highly Conjugated Bis(benzo–1,3–dithiloe) and Bis(benzothiazole) Systems Containing Aromatic Linking Groups: Model Systems for Organic Metals[1]".

J. Org. Chem, (month unavailable), 1992, 57, pp. 1849–1855, G. A. Crispino et al, "Synthesis of Tripyridiniumylpropenyl Anions From Tripyridiniumylcyclopropanes and —cyclopropenes[1]".

J. Am. Chem. Soc, Aug. 31, 1977, 99:18, pp. 6120–6122, R. J. Bose et al, "Bicyclo[1.1.0]butanes. A New Synthetic Route and Valence Isomerizations".

Int. J. Heat Mass Transfer, vol. 31, No. 11, (month available), 1988, pp. 2227–2238, T. Skiepko et al, "The effect of Matrix Longitudinal Heat Conduction on the Temperature Fields in the Rotary Heat Exchanger".

Absorption & Scattering of Light by Small Particles (month unavailable), 1983, pp. 130–141, "Particles Small Compared with the Wavelength".

* cited by examiner

Figure 1

UV PROTECTED ELECTROCHROMIC DEVICE

BACKGROUND OF THE INVENTION

The present invention relates to a UV-protected electrochromic device.

Electrochromic devices are already known, for example, from D. Theis in Ullmann's Encyclopedia of Industrial Chemistry, Vol. A 8, p. 622, Verlag, Chemie 1987 and WO-A 94/23333. A distinction is made between two basic types:

Type 1: all-over electrochromic device.

Type 2: electrochromic display devices with structured electrodes.

Type 1 is used, for example, for electrically darkenable window panes or electrically shadable car mirrors. Such devices are known, for example, from U.S. Pat. No. 4,902,108.

Type 2 is employed in the case of segmented and matrix displays. Such display devices have been proposed, for example, in German Patent Application P 196 31 728. Devices of this kind can be viewed transmissively or, given a mirror coating, reflectively.

WO-A 94/23333 compares electrochromic materials of various construction which, however, are not used as display devices:

Construction a: The electrochromic substances are fixed as a film or coat on the electrodes (cf. Ullmann, see above).

Construction b: The electrochromic substances are deposited a,. a laver on the electrodes by the redox process (cf. Ullmann, see above).

Construction c: The electrochromic substances remain permanently in solution.

For construction a) the best-known electrochromic material is the tungsten oxide/palladium hydride pairing.

For construction b), viologens have been described as electrochromic substances. These devices are not self-erasing, and so the generated image remains after the current has been switched off and can only be erased again by reversing the polarity of the voltage. Such devices are not particularly stable and do not allow a high number of switching cycles.

Cells—and especially those constructed with tungsten oxide/palladium hydride—cannot be operated in transmitted light but only reflectively, owing to light scattering at these electrochromic layers.

Elektrokhimiya, 13, 32–37 (1977), 13, 404–408, 14, 319–322 (1978), U.S. Pat. No. 4,902,108 and U.S. Pat. No. 5,140,455 disclose an electrochromic system of the last-mentioned construction c). An electrochromic cell which is constructed from conductively coated glass plates contains a solution of a pairing of electrochromic substances in an inert solvent.

As a pairing (couple) of electrochromic substances use is made of one electrochemical reversibly reducible substance and one reversibly oxidizable substance. Both are colourless or only slightly coloured in the ground state. Under the influence of an electrical voltage one substance is reduced and the other oxidized, with both becoming coloured. After the voltage has been switched off, the ground state of both substances is formed again, this being accompanied by disappearance or fading of the colour.

$$RED_1 + OX_2 \rightleftharpoons OX_1 + RED_2$$

(colourless) (coloured)
(low-energy couple) (high-energy couple)

From U.S. Pat. No. 4,902,108 it is known that suitable redox couples are those where the reducible substance possesses at least two chemically reversible reduction waves in the cyclic voltammogram and the oxidizable substance, accordingly, possesses at least two chemically reversible oxidation waves.

According to WO-A 94/23333, however, such solution systems of construction c have serious disadvantages.

The diffusion of the electrochromic substances in the solution causes imprecise colour boundaries and requires high current consumption to maintain the coloured state, since the coloured substances are permanently broken down by recombination and reaction at the respectively opposite electrode.

Nevertheless, various applications have been described for such electrochromic cells of construction c. For example, they may be configured as car rearview mirrors which when travelling at night can be darkened by applying a voltage and so prevent dazzling by the headlights of following vehicles (cf. e.g. U.S. Pat. No. 3,280,701, U.S. Pat. No. 4,902,108, EP-A 0 435 689). In addition, such cells can also be employed in window panes or car sunroofs, where following application of a voltage they shade out the sunlight. Likewise described is the use of such devices as electrochromic display devices—for example in segmented or matrix displays with structured electrodes (German Patent Application P 196 31 728).

The electrochromic cells normally consist of a pair of glass plates of which one is mirrored in the case of the car mirror. One side of these plates is coated over its surface with a transparent, electrically conductive coat of, for example, indium tin oxide (ITO), and in the case of the display devices this conductive coating is divided into segments which are electrically separate from one another and are contacted individually. These plates are then used to construct a cell by joining them via a sealing ring with their electrically conductively coated sides facing one another, to form a cell. This cell is then filled by an aperture with an electrochromic fluid. and the cell is sealed tightly. The two plates are connected to a voltage source by way of the ITO coats.

The above-described electrochromic devices are generally sensitive to light, especially UV light. Consequently, in U.S. Pat. No. 5,280,380, for example, electrochromic devices have been described which comprise UV stabilizers.

The UV light absorbers used to date have mostly been organic compounds which have a molecular absorption band in the relevant wavelength range and do not absorb in the visible spectral range. A disadvantage of these compounds is that they must be dissolved, in some cases in high concentrations, in the electrochromic solution or in a polymer layer applied to one of the two plates. Frequently, however, the solubility in these media is limited and so, consequently, is the effectiveness of the UV absorber. In addition, they may fade on exposure to light and/or may be washed out or evaporate from the polymeric substrate.

It is also known that inorganic solid-state materials can absorb UV light.

Depending on the size and choice of material, these inorganic particles may scatter and/or absorb regions of the harmful UV light. Preference should be given in this context to absorption over scattering of light, since scattered photons, especially when the particles are incorporated into the material that is to be protected, may go on to damage this material. In addition, too great a scattered component of the light leads to clouding of the material that is to be protected. From Absorption and Scattering of Light by Small Particles, C. F. Bohren, D. R. Huffman, pp. 93 to 104 and 130 to 141, 1983 it is known that as the size of the particles decreases their absorbency for light is higher than their capacity to scatter light. For a transparent UV light absorber, therefore, only very small particles are suitable. In order to ensure that the UV light absorber is also colourless, the material of the particles must possess an absorption edge in the wavelength range between about 300 nm and 400 nm. According to WO-A 93/06164, materials suitable for such an effect are those having a band gap between 2.8 eV and 4.1 eV, corresponding to a wavelength range of between 303 nm and 445 nm. Materials from this class which have already been used for this purpose include $TiO_2$, ZnO, $CeO_2$ and SiC: see for example WO-A 93/06164, WO-A 95/09895 and WO-A 92/21315.

Consequently, the object was to provide UV absorbers which do not have the disadvantages known from the prior art and which are highly suitable for the UV protection of electrochromic cells.

It has now been found that the above-described electrochromic devices can be effectively protected against destruction by UV light by means of nanoparticles.

The invention accordingly provides an electrochromic device which is protected by nanoparticles against UV light.

SUMMARY OF THE INVENTION

The invention provides preferably an electrochromic device consisting of two plates or films of which at least one is transparent and which are provided on the facing sides with a conductive layer, at least one conductive layer being transparent, and are joined to one another with a sealing ring, the plates or films and the sealing ring defining a volume within which there is an electrochromic medium, characterized in that the electrochromic device is protected by nanoparticles against UV light.

DETAILED DESCRIPTION OF THE INVENTION

The plates comprise glass or plastic and the films comprise plastic or special thin glass.

In one particular embodiment of the electrochromic device, the nanoparticies are present in the electrochromic system and/or are fixed on and/or in at least one of the two transparent plates or films.

Particular preference is given in accordance with the invention to electrochromic devices in which at least one of the two conductive layers is coated with an electrochromic layer, and to electrochromic devices in which the electrochromic medium constitutes an electrochromic solution, characterized in that the electrochromic device is protected by nanoparticles against UV light.

Suitable nanoparticles are those based on SiC, AlSi, , $Fe_2O_3$, $Fe_3O_4$, $TiO_2$, ZnO, GaP, $CeO_2$, ZnS, $SnO_2$, $Si_yGe_{1-y}$, $W_xM_{O1-y}O_3$, NiO, $Bi_2O_3$, $In_2O_3$, $HfO_2$, $BaTiO_3$, $CaTiO_3$, Ge, AlP, GaN, in which $0.7 \leq y < 1$ and $0 \leq x \leq 1$.

Nanoparticles which are particularly suitable in the context of the invention are the materials, known from the abovementioned literature and the patent applications, based on $TiO_2$, ZnO, $CeO_2$, SiC, AlSi, $Fe_2O_3$, $Fe_3O_4$, $W_xMo_{1-x}O_3$, $BaTiO_3$, $CaTiO_3$ or mixtures thereof.

Clouding by the UV absorber particles is unacceptable for an electrochromic device, since the various fields of use referred to, such as car mirrors or display devices, require high transmission of the light and, in particular, precise imaging. Radical-forming particles are particularly unsuitable for use when these particles are present in the electrochromic solution. Interaction with the generally free-radical or ionic free-radical $OX_1$ and $RED_2$ formed by electrode reaction would intervene in the equilibrium depicted above and lead to unwanted colour changes and/or to inadequate colour erasure after the voltage had been switched off. Particular preference is given to nanoparticles having an average diameter of less than 500 nm, preferably less than 100 nm, with particular preference less than 50 nm and, with very particular preference, less than 20 nm.

Very particular preference is given therefore to UV light absorbers predominantly comprising particles of silicon and/or of solid compounds in which silicon is present in a stoichiometric excess. An average diameter of less than 120 nm is advantageous. Such absorbers have advantageous properties, such as high transparency in the visible spectral range at relatively low particle concentrations, high stability to air, high environmental compatibility and biocompatibility, complete absence of photocatalytical activities, and are also highly effective at filtering out light in the UVA and UVB range.

By average diameter is meant the maximum of the frequency distribution.

Elemental silicon comprises amorphous or crystalline silicon, preferably crystalline silicon. The size of the silicon particles is preferably between 1 nm and 120 nm, with particular preference between 1 nm and 70 nm and, with very particular preference, between 10 nm and 50 nm. Preferably, these particles have a size distribution with a maximum mid-peak width of 40 nm. Silicon particles having this average diameter are preferably prepared by means of gas-phase reaction (CVR) in accordance with the process described in U.S. Pat. No. 5,472,477. Likewise possible is their preparation in accordance with J. Phys. Chem., 97, pp. 1224 to 1230 (1973), J. Vac. Sci. Technol. A10, p. 1048 (1992) and Int. J. Heat Mass Transfer 31, p. 2236 (1988).

The term solid compounds covers compounds which are solid at room temperature, such as silicides, $CaSi_2$ and/or $BaSi_2$, for example. The phrase "compounds in which silicon is present in stoichiometric excess" covers preferably compounds of the formula $Si_xZ_{1-x}$ where $0.5 \leq x \leq 1$, preferably $0.7 \leq x < 1$ and Z=C, N, O, Ge, Ca, Ba and Sr. The presence of other materials shifts the energy position of the absorption edge within certain limits and modifies the form of the edge. Solid compounds to which preference is given in this context are $Si_xC_{1-x}$ or $Si_xGe_{1-x}$.

Those nanoparticles of all materials described hitherto that are preferred are those which are spherical or almost spherical. By almost spherical is meant, for example, ellipsoids having an axial ratio of 1:4, preferably 1:2.

Preference is likewise given to nanoparticles of all materials described hitherto that have a core-shell structure. The shell can be organically modified.

The shell consists, for example, of an oxide of the material of the nanoparticle. Alternatively, it may consist of another material which is transparent in the visible range and whose refractive index is similar to that of the nanoparticle. The thickness of an oxide layer can be, for example, between 1 and 300 nm.

In a preferred embodiment of the invention the solid compounds in which silicon is present in stoichiometric excess have a core-shell structure. It is preferred for this structure to consist of a core of titanium nitride and a shell of silicon, the proportion of silicon by volume being at least 30% per particle.

The average diameter of the particles of all types described hitherto is preferably less than 120 nm, with particular preference less than 100 nm and, with very particular preference, less than 50 nm. These particles preferably have a particle size distribution with a maximum mid-peak width of 40 nm, preferably 30 nm and, with particular preference, 20 nm.

The solid compounds, including those with a core-shell structure, can be prepared, for example, by thermal decomposition of a silicon-containing gas, examples being silanes, organosilanes or $SiCl_4$, to give an aerosol (see J. Phys. Chem., 97, pp. 1224 to 1230 (1973), J. Vac. Sci. Technol. A10, p. 1048 (1992). By mixing in further gases containing, for example, germanium or carbon, compounds of appropriate stoichiometric composition are formed. In the case of solid compounds having a core-shell structure, the core is prepared first of all by the above-described processes and then the shell is applied by decomposition or reaction in the gas phase of gases of appropriate composition, such as, for example, $SiH_4$ or $SiCl_4$ together with $H_2$. The thermal decomposition can take place in a gas-phase reactor, preferably in a CVR (chemical vapour reaction) reactor, or else by laser absorption (see Int. J. Heat Mass Transfer, 31, p. 2239 (1988)). The thermal decomposition of gases is particularly suitable for preparing crystalline particles. Likewise possible is preparation by way of a PECVD (plasma enhanced chemical vapour deposition) process (see J. Vac. Sci. Technol., A10, p. 1048 (1992)). The latter process produces amorphous particles which can be rendered crystalline by thermal aftertreatment (see Nanostructured Materials, Vol. 6, pp. 493 to 496 (1995)).

The particles in the UV light absorber can also be in the form of agglomerates. In the case of silicon, the optical properties of the agglomerates differ from those of the primary particles, since the electromagnetic interaction of the particles with one another forms new absorption channels some of which also lie within the visible spectral range.

The primary particles in the UV light absorber can also be surrounded by an oxide layer. This prevents direct contact of the primary particles and hence their agglomeration. The thickness of the oxide layer is preferably from 1 nm to 300 nm, with particular preference from 10 to 100 nm. Advantageous oxide layers are those whose refractive index in the visible spectral range has very similar values to that of the media that are to be protected against UV radication, such as, for example: polycarbonate, polyurethane, organic solutions such as the electrochromic medium. As a result there is a reduction in the light-scattering effect and the matrix remains transparent. This oxide layer can be produced, for example, by metering oxygen into the CVR reactor following the preparation of particles.

In one preferred embodiment the UV light absorber of the invention additionally comprises particles of, for example, oxides and/or nitrides of the metals which absorb more greatly in the red spectral range from 600 nm $<\lambda<700$ nm than in the blue-green spectral range from 400 nm $<\lambda<550$ nm. Preferred such additions are particles of titanium nitride having an average diameter of from 1 nm to 400 nm, preferably from 10 nm to 120 nm, or agglomerates of the titanium nitride primary particles. They can be prepared, for example, in accordance with U.S. Pat. No. 5,472,477. In one preferred embodiment the UV light absorber comprises not only the silicon particles but also TiN particles having an average diameter of from 10 to 120 nm. This UV light absorber is highly effective in the UVA region and at the same time ensures colour neutrality coupled with high transparency. Preference is likewise given to additions in the form of particles of aluminium sodium silicates (ultramarine pigments), obtainable for example from Nubiola S. A., under the designation Nubix® pigments. A further additive which they may include is iron(III) hexacyanoferrate(II).

In a further embodiment of the invention the UV light absorber consists preferably of a mixture of the silicon-containing particles and of particles from the following group:silicon carbide and/or oxides of the metals titanium, cerium, tungsten, zinc, tin and iron. By means of such mixtures it is possible to manipulate the absorption edge, and especially its steepness. The particle size of the admixed particles is preferably between 1 nm and 200 nm. These particles too are obtainable inter alia by the process described in U.S. Pat. No. 5,472,477.

Materials for electrochromic layers are either inorganic layers, such as the tungsten oxide/palladium hydride system described earlier above, or organic layers consisting, for example, of electrochromic substances as set out below for specific application in an electrochromic solution. Oligomeric and polymeric electrochromic substances of this kind, in particular, are suitable for layers, as are those electrochromic substances which are rendered insoluble by means, for example, of the choice of counterion.

The invention likewise provides electrochromic devices of the invention, characterized in that they comprise as electrochromic solution a) a solvent, b) dissolved in this solvent, at least one reversibly oxidizable substance $RED_1$, which releases electrons at an anode, and at least one reversibly reducible substance $OX_2$, which accepts electrons at a cathode, and in so doing are converted to their respective forms $OX_1$ and $RED_2$, respectively, at least one of these releases or acceptances of the electrons being associated with a change in the absorbance in the visible region of the spectrum, and the original forms $RED_1$ and $OX_2$ being reconstituted in each case following charge equalization, and c) dispersed nanoparticles.

By dispersed nanoparticles are meant the inorganic solid-state materials described in more detail above.

By the change in absorbance in the visible region of the spectrum can be meant that a) $OX_2$ and/or $RED_1$ are colourless or only slightly coloured, while the forms $RED_2$ and/or $OX_1$ formed at the cathode and anode, respectively, are coloured, preferably highly coloured, b) at least one of the two electrochromic substances $OX_2$ or $RED_1$ is coloured while its forms $RED_2$ or $OX_1$, respectively, formed at the cathode or anode, respectively, are colourless or only slightly coloured or a different colour.

By selecting the electrochromic compounds $RED_1$ and $OX_2$ and/or mixtures thereof it is possible to establish any desired monochrome shades. For polychromic colouration it is possible to place two-dimensionally atop one another two or more such electrochromic devices each of which is able to produce a different shade. A stack of this kind is preferably constructed such that the devices in contact with one another have in common a transparent plate which is then conductively coated on both sides and divided into segments in accordance with its configuration. A stack will then consist, for example, of three electrochromic devices comprising at least four plates. By switching on segments in different devices in this stack it is possible to realize multicolour displays. When the segments of various such devices that are switched on lie behind one another, mixed colours are obtained. Hence within the framework of a trichromatic system it is possible to produce any desired colours and so, for example, multicolour images.

$OX_2$ and $RED_1$ substances which are suitable in the context of the invention are those which on reduction or oxidation at the cathode or anode, respectively, in the stated solvent yield products $RED_2$ and $OX_1$ which do not enter into any subsequent chemical reaction but instead can be oxidized or reduced again completely to give $OX_2$ and $RED_1$, respectively.

Reducible substances $OX_2$ which are suitable in the context of the invention are those a1) which in the solvent used in the device exhibit a cyclic voltammogram which possesses at least one, preferably at least two chemically reversible reduction stages;

b1) which represent an organic compound, for example a cyclic organic compound, which on acceptance of 1 or 2 electrons undergoes scission of one of the a bonds to form a compound, for example an open-ring compound, and which by releasing 1 or 2 electrons turns back into the original—cyclic, for example, —compound.

Oxidizable substances $RED_1$ which are suitable in the context of the invention are those, a2) which in the solvent used in the device exhibit a cyclic voltammogram which possesses at least one, preferably at least two chemically reversible oxidation stages;

b2) which represent an organic compound, for example a cyclic organic compound, which on release of 1 or 2 electrons undergoes scission of one of the σ bonds to form a compound, for example an open-ring compound, and which by accepting 1 or 2 electrons turns back into the original—cyclic, for example, —compound.

In the cyclic voltammogram, such compounds specified under b1) and b2) generally exhibit a chemically irreversible reduction or oxidation stage followed by a chemically irreversible oxidation or reduction stage, respectively. In general, a total of two electrons are transferred in the course of scission or formation of the σ bond. The compounds under b1) and b2) should not, however, be restricted to those which display the behaviour set out above in the cyclic voltammogram or in which two electrons are transferred on scission or formation of the σ bond or in which scission or formation of the σ bond is associated with ring opening or ring closure.

Suitable $OX_2$ compounds in the sense of the invention are:

(II)

(III)

(IV)

(V)

(VI)

(VII)

(VIII)

(IX)

-continued (CI)

(CII)

(CIII)

(CIV)

in which
- $R^2$ to $R^5$, $R^8$, $R^9$, $R^{16}$ to $R^{19}$ independently of one another denote $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, or
- $R^4$; $R^5$ or $R^8$; $R^9$ can together form a —$(CH_2)_2$— or —$(CH_2)_3$ bridge,
- $R^6$, $R^7$ and $R^{22}$ to $R^{25}$ independently of one another denote hydrogen, $C_1$- to $C_4$-alkyl, $C_1$- to $C_4$-alkoxy, halogen, cyano, nitro or $C_1$- to $C_4$-alkoxycarbonyl, or
- $R^{22}$; $R^{23}$ and/or $R^{24}$; $R^{25}$ can form a —CH=CH—CH=CH bridge,
- $R^{10}$; $R^{11}$, $R^{12}$; $R^{13}$ and $R^{14}$ $R^{15}$ independently of one another denote hydrogen or in pairs denote a —$(CH_2)_2$—, —$(CH_2)_3$— or —CH=CH— bridge,
- $R^{20}$ and $R^{21}$ independently of one another denote O, N—CN, C(CN)$_2$ or N—$C_6$- to $C_{10}$-aryl,
- $R^{26}$ and $R^{27}$ denote hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl,
- $R^{69}$ to $R^{74}$ independently of one another denote hydrogen or $C_1$- to $C_6$-alkyl, or
- $R^{69}$; $R^{12}$ and/or $R^{70}$; $R^{13}$ together form a —CH=CH—CH=CH— bridge,
- $E^1$ and $E^2$ independently of one another denote O, S, NR$^1$ or C(CH$_3$)$_2$ or
- $E^1$ and $E^2$ together form a —N—(CH$_2$)$_2$—N— bridge,
- $R^1$ denotes $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl,
- $Z^1$ denotes a direct bond, —CH=CH—, —C(CH$_3$)=CH—, —C(CN)=CH—, —CCl=CCl—, —C(OH)=CH—, —CCl=CH—, —C≡C—, —CH=N—N=CH—, —C(CH$_3$)=N—N=C(CH$_3$)— or —CCl=N—N=CCl—,
- $Z^2$ denotes —(CH$_2$)$_r$— or —CH$_2$—C$_6$H$_4$—CH$_2$—, r denotes an integer from 1 to 10,
- $R^{101}$ to $R^{105}$ independently of one another denote $C_6$- to $C_{10}$-aryl or an optionally benzo-fused aromatic or quasiaromatic five- or six-membered heterocyclic ring,
- $R^{107}$, $R^{109}$, $R^{113}$ and $R^{114}$ independently of one another denote a radical of the formulae (CV) to (CVII)

(CV)

(CVI)

(CVII)

- $R^{108}$, $R^{115}$ and $R^{116}$ independently of one another denote $C_6$- to $C_{10}$-aryl or a radical of the formula (CV),
- $R^{110}$ to $R^{112}$, $R^{117}$ and $R^{118}$ independently of one another denote hydrogen, $C_1$- to $C_4$-alkyl, halogen or cyano,
- $E^{101}$ and $E^{102}$ independently of one another denote O, S or N—R$^{119}$,
- $R^{119}$ and $R^{122}$ independently of one another denote $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl,
- $R^{106}$, $R^{120}$, $R^{121}$, $R^{123}$ and $R^{124}$ independently of one another denote hydrogen, $C_1$- to $C_4$-alkyl, $C_1$- to $C_4$-alkoxy, halogen, cyano, nitro or $C_1$- to $C_4$-alkoxycarbonyl, or
- $R^{120}$, $R^{121}$ and/or $R^{123}$, $R^{124}$ together form a —CH=CH—CH=CH— bridge, and
- X$^-$ denotes an anion which is redox-inert under the conditions.

OX$_2$ compounds which are suitable in the context of the invention are also metal salts or metal complexes, preferably of those metal ions whose oxidation states differ by 1. Examples of suitable metal ions OX$_2$/RED$_2$ are Fe$^{3+}$/Fe$^{2+}$, Ni$^{3+}$/Ni$^{2+}$, Co$^{3+}$/Co$^{2+}$, Cu$^{2+}$/Cu$^+$.

Suitable RED$_1$ substances in the context of the invention are:

(X)

(XI)

(XII)

(XIII)

(XIV)

(XV)

(XVI)

(XVII)

(XVIII)

(XIX)

(XX)

in which $R^{28}$ to $R^{31}$, $R^{34}$, $R^{35}$, $R^{38}$, $R^{39}$, $R^{46}$, $R^{53}$ and $R^{54}$ independently of one another denote $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{58}$ independently of one another denote hydrogen, $C_1$- to $C_4$-alkyl, $C_1$- to $C_4$-alkoxy, halogen, cyano, nitro, $C_1$- to $C_4$-alkoxycarbonyl or $C_6$- to $C_{10}$-aryl and $R^{57}$ and $R^{58}$ additionally denote an aromatic or quasiaromatic five- or six-membered heterocyclic ring, which is optionally benzo-fused, and $R^{48}$ additionally denotes $NR^{75}R^{76}$, or $R^{49}$, $R^{50}$ and/or $R^{51}$, $R^{52}$ form a —(CH$_2$)$_3$—, —(CH$_2$)$_4$—, —(CH$_2$)$_5$— or —CH=CH—CH=CH— bridge, $Z^3$ denotes a direct bond or a —CH=CH— or —N=N— bridge, =$Z^4$= denotes a direct double bond or a =CH—CH= or =N—N= bridge, $E^3$ to $E^5$, $E^{10}$ and $E^{11}$ independently of one another denote O, S, $NR^{59}$ or $C(CH_3)_2$, and $E^5$ additionally denotes C=O or SO$_2$, $E^3$ and $E^4$ independently of one another may additionally denote —CH=CH—, $E^6$ to $E^9$ independently of one another denote S, Se or $NR^{59}$, $R^{59}$; $R^{75}$ and $R^{76}$ independently of one another denote $C_1$- to $C_{12}$-alkyl, $C_2$- to $C_8$-alkenyl, $C_4$- to $C_7$-cycloalkyl, $C_7$- to $C_{15}$-aralkyl or $C_6$- to $C_{10}$-aryl, and $R^{75}$ additionally denotes hydrogen or $R^{75}$ and $R^{76}$ in the definition of $NR^{75}R^{76}$, together with the N atom to which they are attached, denote a five- or six-membered ring which optionally contains further heteroatoms,

$R^{61}$ to $R^{68}$ independently of one another denote hydrogen, $C_1$- to $C_6$-alkyl, $C_1$- to $C_4$-alkoxy, cyano, $C_1$- to $C_4$-alkoxycarbonyl or $C_6$- to $C_{10}$-aryl and $R^{61}$, $R^{62}$ and $R^{67}$, $R^{68}$ independently of one another additionally form a —(CH$_2$)$_3$—, —(CH$_2$)$_4$— or —CH=CH—CH=CH— bridge, and v denotes an integer between 0 and 10.

RED$_1$ substances which are suitable in the context of the invention are also metal salts or metal complexes, preferably of those metal ions whose oxidation states differ by 1. Examples of suitable metal ions RED$_1$/OX$_1$ are $Fe^{2+}/Fe^{3+}$, $Ni^{2+}/Ni^{3+}$, $Co^{2+}/Co^{3+}$, $Cu^+/Cu^{2+}$.

Likewise suitable in the sense of the invention are those redox couples which are linked to one another by way of a covalent bridge in accordance with the formula (I), in which Y and Z independently of one another represent a radical $OX_2$ or $RED_1$, where at least one Y represents $OX_2$ and at least one Z represents $RED_1$, where $OX_2$ represents the radical of a reversibly electrochemically reducible redox system and $RED_1$ represents the radical of a reversibly electrochemically oxidizable redox system, B represents a bridge member, c represents an integer from 0 to 1000 and a and b independently of one another represent an integer from 0 to 100.

Preferably $(a+b).c \leq 10,000$.

By reversibly electrochemically reducible or oxidizable in this context is meant that the electron transfer can take place with or without a change in the σ structure, entirely in the sense of the above definition of the $OX_2$ and $RED_1$ substances of the invention.

In particular, the electrochromic compounds of the formula (I) mean those of the formula (Ia), (Ib), (Ic), or (Id)

in which $OX_2$, $RED_1$ and B have the meaning indicated above and d represents an integer from 1 to 5.

$OX_2$ and $RED_1$ in the formulae (I) and (Ia) to (Id) mean in particular radicals of the above-described redox systems of the formulae (II) to (IX), (CI) to (CIV) and (X) to (XX) where the bond to the bridge member B is via one of the radicals $R^2$ to $R^{19}$, $R^{22}$ to $R^{27}$, $R^{28}$ to $R^{58}$, $R^{61}$, $R^{62}$, $R^{67}$, $R^{68}$ and $R^{122}$ or, if one of the radicals $E^{101}$ to or $E^2$ is $NR^1$ or one of the radicals $E^3$ to $E^{11}$ is $NR^{59}$ or one of the radicals $E^{101}$ to $E^{102}$ is $NR^{119}$, is via $R^1$, $R^{59}$ or $R^{119}$ respectively, and in that case these radicals represent a direct bond, and B represents a bridge of the formula $—(CH_2)_n—$ or $—[Y^1{}_s(CH_2)_m—Y^2]_o—(CH_2)_p—Y^3{}_q—$ which can be substituted by $C_1$- to $C_4$-alkyl, $C_1$- to $C_4$-alkoxy, halogen or phenyl, $Y^1$ to $Y^3$ independently of one another represent O, S, $NR^{60}$, COO, CONH, NHCONH, cyclopentanediyl, cyclohexanediyl, phenylene or naphthylene, $R^{60}$ denotes $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl, n denotes an integer from 1 to 12, m and p independently of one another denote an integer from 0 to 8, o denotes an integer from 0 to 6 and q and s independently of one another denote 0 or 1.

Examples of metal salts or metal complexes which can be employed as $OX_2$ or $RED_1$ are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3^{0/4-}$, $[Co(CN)_6]^{3-/4-}$, $[Fe(cyclopentadienyl)_2]^{0/+}$.

Suitable counterions for metal ions and cationic complexes are all redox-inert anions $X^-$, as are described below in more detail, and suitable counterions of the anionic complexes are all redox-inert cations $M'^+$, examples being alkali metals or quaternized ammonium salts, such as $Na^+$, $K^+$, $N(CH_3)_4{}^+$, $N(C_4H_9)_4{}^+$, $C_6H_5CH_2N(CH_3)_3{}^+$ et cetera.

Preference is given to an electrochromic display device in which $OX_2$ represents a radical of the formula (II), (III), (IV), (V) or (CI), in which $R^2$, $R^3$, $R^4$, $R^5$, $R^8$ and $R^9$ independently of one another denote $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^6$ and $R^7$ independently of one another denote hydrogen, methyl, ethyl, methoxy, ethoxy, fluorine, chlorine, bromine, cyano, nitro, methoxycarbonyl or ethoxycarbonyl, $R^{10}$, $R^{11}$, $R^{12}$, $R^{13}$ and $R^{14}$, $R^{15}$ independently of one another represent hydrogen or, if $Z^1$ denotes a direct bond, represent in pairs a $—(CH_2)_2—$, $—(CH_2)_3—$ or $—CH=CH—$ bridge, or $R^4$, $R^5$ and $R^8$, $R^9$ independently of one another in pairs denote a $—(CH_2)_2—$ or $—(CH_2)_3—$ bridge if $Z^1$ denotes a direct bond, and in that case $R^{69}$ to $R^{74}$ independently of one another denote hydrogen or $C_1$- to $C_4$-alkyl, $E^1$ and $E^2$ are identical and denote O, S, $NR^1$ or $C(CH_3)_2$ or together form an $—N—(CH_2)_2—N$ bridge,

$R^1$ denotes $C_1$- to $C_{12}$-alkyl, $C_2$- to $C_4$-alkenyl, $C_5$- to $C_7$-cycloalkyl, $C_7$- to $C_{15}$-aralkyl or $C_6$- to $C_{10}$-aryl,

$Z^1$ denotes a direct bond, $—CH=CH—$, $—C(CH_3)=CH—$, $—C(CN)=CH—$, $—C\equiv C—$ or $—CH=N—N=CH—$, $Z^2$ denotes $—(CH_2)_r—$ or $—CH_2—C_6H_4—p—CH_2—$, r denotes an integer between 1 and 6, $R^{101}$ to $R^{103}$ independently of one another represent a radical of the formulae (CXIX)

(CXX)

in which $R^{157}$ to $R^{162}$ independently of one another denote hydrogen, $C_1$- to $C_6$-alkyl, $C_1$- to $C_6$-alkoxy, halogen, cyano, nitro, bis-($C_1$- to $C_4$-alkyl)amino, tris-($C_1$- to $C_4$-alkyl)ammonio, $C_1$- to $C_4$-alkoxycarbonyl or COOH, or adjacent radicals in pairs together form an $—O—(CH_2)_{2-3}—$, $—O—(CH_2)_{1-2}—O—$, $NR^{163}—(CH_2)_{2-3}—$ or $NR^{163}—(CH_2)_{1-2}—O—$ bridge, or $R^{158}$, $R^{159}$ and/or $R^{161}$, $R^{162}$ form a $—CH=CH—CH=CH—$ bridge which can be substituted by methyl, methoxy or chlorine, $R^{163}$ denotes hydrogen or $C_1$- to $C_4$-alkyl, $E^{112}$ denotes O, S or $NR^{164}$, $R^{164}$ denotes hydrogen, $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, and $X^-$ denotes a colourless anion which is redox-inert under the conditions, $RED_1$ represents one of the radicals of an anodic redox system of the formula (X), (XI), (XII), (XIII), (XVI), (XVII), (XVIII) or (XX), $R^{28}$ to $R^{31}$, $R^{34}$, $R^{35}$, $R^{38}$, $R^{39}$, $R^{46}$, $R^{53}$ and $R^{54}$ independently of one another denote $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{47}$, $R^{48}$, $R^{49}$ to $R^{52}$, $R^{55}$ and $R^{56}$ independently of one another denote hydrogen, methyl, ethyl, methoxy, ethoxy, fluorine, chlorine, bromine, cyano, nitro, methoxycarbonyl, ethoxycarbonyl or phenyl, $R^{48}$ additionally denotes $NR^{75}R^{76}$, $Z^3$ denotes a direct bond or a —CH=CH— or —N=N— bridge, =$Z^4$= denotes a direct double bond, an =CH—CH= or =N—N= bridge, $E^3$ to $E^5$, $E^{10}$ and $E^{11}$ independently of one another denote O, S, $NR^{59}$ or $C(CH_3)_2$, but $E^3$ and $E^4$ have the same meaning, $E^6$ to $E^9$ are identical to one another and denote S, Se or $NR^{59}$, and $E^5$ additionally denotes C=O, $R^{59}$, $R^{75}$ and $R^{76}$ independently of one another denote $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, and $R^{75}$ additionally denotes hydrogen or $R^{75}$ and $R^{76}$ in the definition of $NR^{75}R^{76}$, together with the N atom to which they are attached, denote pyrrolidino, piperidino or morpholino, $R^{61}$, $R^{62}$, $R^{67}$ and $R^{68}$ independently of one another denote hydrogen, $C_1$- to $C_4$ alkyl, methoxycarbonyl, ethoxycarbonyl or phenyl or in pairs form a —$(CH_2)_3$— or —$(CH_2)_4$— bridge, $R^{63}$ to $R^{66}$ denote hydrogen and v denotes an integer from 1 to 6.

Preference is likewise given to an electrochromic device which comprises one of the compounds of the formulae (Ia) to (Id), in which $OX_2$ represents one of the radicals of the formulae (II), (III), (IV) and (V)

where the bond to the bridge member B is via one of the radicals $R^2$ to $R^{11}$ or, if $E^1$ or $E^2$ represents $NR^1$, is via $R^1$ and in that case these radicals represent a direct bond and all other radicals possess the preferred meaning set out above, $RED_1$ represents one of the radicals of the formulae (X), (XI), (XII), (XIII), (XVI), (XVII), (XVIII) and (XX), where the bond to the bridge member B is via one of the radicals $R^{28}$ to $R^{41}$, $R^{46}$ to $R^{56}$, $R^{61}$, $R^{62}$, $R^{67}$ and $R^{68}$ or, if one of the radicals $E^3$ to $E^{11}$ is $NR^{59}$, is via $R^{59}$ and in that case these radicals represent a direct bond and all other radicals possess the preferred meaning set out above, and B represents a bridge of the formulae —$(CHR^{80})_s$—$(CH_2)_n$—$(CHR^{80})_s$—, —$(CHR^{80})_s$—$(CH_2)_m$—O—$(CH_2)_p$—$(CHR^{80})_s$—, —$(CHR^{80})_s$—$(CH_2)_m$—$NR^{60}$—$(CH_2)_p$—$(CHR^{80})_s$—, —$(CHR^{80})_s$—$(CH_2)_m$—$C_6H_4$—$(CH_2)_p$—$(CHR^{80})_s$—, —[O—$(CH_2)_p]_o$—O—, —[$NR^{60}$—$(CH_2)_p]_o$—$NR^{60}$—, —$(CHR^{80})_s$—$(CH_2)_m$—OCO—$C_6H_4$—COO—$(CH_2)_p$—$(CHR^{80})_s$—, —$(CHR^{80})_s$—$(CH_2)_m$—NHCO—$C_6H_4$—CONH—$(CH_2)_p$—$(CHR^{80})_s$—, —$(CHR^{80})_s$—$(CH_2)_m$—NHCONH—$C_6H_4$—NHCONH—$(CH_2)_p$—$(CHR^{80})_s$—, —$(CHR^{80})_s$—$(CH_2)_m$—OCO—$(CH_2)_t$—COO—$(CH_2)_p$—$(CHR^{80})_s$—, —$(CHR^{80})_s$—$(CH_2)_m$—NHCO—$(CH_2)_t$—CONH—$(CH_2)_p$—$(CHR^{80})_s$—, —$(CHR^{80})_s$—$(CH_2)_m$—NHCONH—$(CH_2)_t$—NHCONH—$(CH_2)_p$—$(CHR^{80})_s$—, $R^{60}$ denotes methyl, ethyl, benzyl or phenyl, $R^{30}$ denotes hydrogen, methyl or ethyl, n denotes an integer from 1 to 10, m and p independently of one another denote an integer from 0 to 4, o denotes an integer from 0 to 2, s denotes 0 or 1 and t denotes an integer from 1 to 6.

Preference is likewise given to an electrochromic device which comprises mixtures of the above electrochromic substances specified in general and as preferred. Examples of such mixtures are (II)+(CI)+(XVI), (II)+(IV)+(XII), (Ia)+(II)+(XVI), (Ia)+(CI), without thereby intending to express any restriction whatsoever.

The mixing proportions are variable within wide limits. They permit the optimization of a desired shade and/or the optimization of the desired dynamics of the device.

In the above definitions of substituents alkyl radicals, including modified forms such as alkoxy or aralkyl radicals, for example, are preferably those having 1 to 12 C atoms, in particular having 1 to 8 C atoms, unless indicated otherwise. They can be straight-chain or branched and optionally carry further substitutents such as $C_1$- to $C_4$-alkoxy, fluorine, chlorine, hydroxyl, cyano, $C_1$- to $C_4$-alkoxycarbonyl or COOH.

By cycloalkyl radicals are meant preferably those having 3 to 7 C atoms, in particular having 5 or 6 C atoms.

Alkenyl radicals are preferably those having 2 to 8 C atoms, especially 2 to 4 C atoms.

Aryl radials, including those in aralkyl radicals, are phenyl or naphthyl radicals, especially phenyl radicals. They can be substituted by 1 to 3 of the following radicals: $C_1$- to $C_6$-alkyl, $C_1$- to $C_6$-alkoxy, fluorine, chlorine, bromine, cyano, hydroxyl, $C_1$- to $C_6$-alkoxycarbonyl or nitro. Two adjacent radicals may also form a ring.

By optionally benzo-fused aromatic or quasiaromatic five- or six-membered heterocyclic rings are meant in particular imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They can be substituted by 1 to 3 of the following radicals: $C_1$- to $C_6$-alkyl, $C_1$- to $C_6$-alkoxy, fluorine, chlorine, bromine, cyano, nitro, hydroxyl, mono- or di-$C_1$- to $C_6$-alkylamino, $C_1$- to $C_6$-alkoxycarbonyl, $C_1$- to $C_6$alkylsulphonyl, $C_1$- to $C_6$- alkanoylamino, phenyl or naphthyl. Two adjacent radicals may also form a ring.

The electrochromic substances are either known (Topics in Current Chemistry, Vol. 92, pp. 1–44, (1980), Angew. Chem. 90, 927 (1978), Adv. Mater. 3. 2 25, (1991), DE-A 3.917.323, J. Am. Chem. Soc. 117, 8528 (1995), J. C. S. Perkin 11 1990, 1777, DE-A 4.435.211, EP-A 476.456, EP-A 476.457, DE-A 4.007.058, J. Org. Chem. 57, 1849

(1992) and J. Am. Chem. Soc. 99, 6120, 6122 (1977) or can be prepared analogously. The compounds of the formula (I) can be synthesized from building blocks which are known per se, in accordance, for example, with the following scheme:

Ions arising from the synthesis, such as bromide, are swapped subsequently for redox-inert ions.

The electrochromic display device of the invention comprises at least one solvent in which the electrochromic substances, optionally a conductive salt and optionally further additives are in solution. The solvent can also have been thickened in gel form by means, for example, of polyelectrolytes, porous solids or nanoparticles having a large active surface.

Suitable solvents are all solvents which are redox-inert at the chosen voltages and which are unable to give off any electrophiles or nucleophiles or to react themselves as sufficiently strong electrophiles or nucleophiles and so to react with the coloured ionic radicals. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulpholane, 3-methylsulpholane or mixtures thereof. Preference is given to propylene carbonate and mixtures thereof with glutaronitrile or 3-methylsulpholane.

The electrochromic solution of the invention can comprise at least one inert conductive salt. The addition of a conductive salt can be omitted in particular when at least one of the substances of the couple $RED_1/OX_2$ is ionic in nature.

Lithium, sodium and tetraalkylammonium salts, especially the latter, are suitable as the inert conductive salt. The alkyl groups can have between 1 and 18 C atoms and can be identical or different. Tetrabutylammonium is preferred. Suitable anions to these salts, also suitable as anions X⁻ in the formulae (II) to (VI), (CI), (CII) and (CV) to (CVII) in the metal salts, are all redox-inert, colourless anions. Examples are tetrafluoroborate, tetraphenylborate, cyanotriphenylborate, tetramethoxyborate, tetrapropoxyborate, tetraphenoxyborate, perchlorate, chloride, nitrate, sulphate, phosphate, methanesulphonate, ethanesulphonate, tetra-decanesulphonate, pentadecanesulphonate, trifluoromethanesulphonate, perfluorobutane-sulphonate, perfluoroctanesulphonate, benzenesulphonate, chlorobenzenesulphonate, toluenesulphonate, butylbenzenesulphonate, tert-butylbenzenesulphonate, dodecylbenzenesulphonate, trifluoromethylbenzenesulphonate, hexafluorophosphate, hexafluoroarsenate, hexafluorosilicate, 7,8- or 7,9-dicarbanido-undecaborate(-1) or (-2), which are optionally substituted on the B and/or C atoms by one or two methyl, ethyl, butyl or phenyl groups, dodecahydro-dicarbadodecaborate(-2) or B-methyl-C-phenyldodecahydro-dicarbadodecaborate(-1).

The conductive salts are preferably employed in the range from 0 to 1 mol/l.

Further additives employed can be thickeners, in order to control the viscosity of the electroactive solution. This may be significant in avoiding segregation, i.e. the formation of coloured streaks or spots on prolonged operation of the electrochromic device in the switched-on state, and in controlling the rate of fade after the current is switched off.

Suitable thickeners are all compounds usual for this purpose, such as polyacrylate, polymethacrylate (Luctite L®), polycarbonate or polyurethane, for example.

Further additives suitable for the electrochromic fluid, for reinforcing the UV protection in certain cases, are UV absorbers. Examples are UVINUL® 3000 (2,4-di-hydroxybenzophenone, BASF), SANDUVOR® 3035 (2-hydroxy-4-n-octyloxybenzophenone, Clariant), Tinuvin®571 (2-(2 H-benzotriazol-2-yl)-6-dodecyl-4-methylphenol, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), UVINUL® 3039 (2-ethylhexyl-2-cyano-3,3-diphenylacrylate, BASF), UVINUL® 3088 (2-ethylhexyl p-methoxycinnamate, BASF) and CHIMASSORB® 90 (2-hydroxy-4-methoxy-benzophenone, Ciba).

The four latter absorbers are preferred. Preference is likewise given to mixtures of UV absorbers, examples being mixtures of the four latter absorbers. Preference is given to the mixture UVINUL® 3039 (BASF) and CHIMASSORB® 90.

The UV absorbers are employed in the range from 0.01 to 2 mol/l, preferably from 0.04 to 1 mol/l.

The electrochromic solution comprises the electrochromic substances $OX_2$ and $RED_1$, especially those of the formulae (I) to (XX) and (CI) to (CIV), in each case in a concentration of at least $10^{-4}$ mol/l, preferably from 0.001 to 0.5 mol/l. The overall concentration of all electrochromic substances present is preferably below 1 mol/l.

The electrochromic device of the invention is operated using constant, pulsed or variable-amplitude—varying, for example, sinusoidally—direct current. The voltage depends on the desired depth of colour, in particular on the reduction or oxidation potentials, respectively, of the $OX_2$ and $RED_1$ substances used. Such potentials can be found, for example, in Topics in Current Chemistry, Volume 92, pp. 1–44, (1980) or Angew. Chem. 90, 927 (1978) or the literature cited therein. The difference in their potentials is a guide parameter for the required voltage, although the electrochromic device can be operated even at a lower voltage or else at a higher voltage. In many cases, for example when using $OX_2$= formula (II) or (IV) and $RED_1$=formula (X), (XII), (XVI) or (XVII) or a form thereof linked via a bridge in accordance with formula (I), especially formula (Ia) to (Id), this potential difference required for operation is ≦1 V. Such electrochromic devices can therefore be supplied in a simple manner with the current from photovoltaic silicon cells.

If the voltage is switched off, the electrochromic device of the invention reverts to its original state. This erasure can be accelerated considerably if the contacted segments and/or plates are short-circuited. The display can also be erased very rapidly by multiple reversal of the polarity of the voltage, without or with simultaneous reduction in the voltage.

By varying the layer thickness of the electrochromic device, the viscosity of the electrochromic solution and/or the diffusion or drift capacity of the electrochromic substances it is possible to influence the switch-on and switch-off times of the display device within wide limits. For example, thin layers exhibit shorter switching times than do thick layers. It is therefore possible to construct rapid- and slow-switchable devices and so to tailor them to the respective end uses.

In the case of slow devices, especially display devices, a current-saving or refresh mode can be used to maintain the displayed information in the switched-on state. After the information to be displayed has been set up by means, for example, of constant or pulsed direct voltage or direct voltage which varies with high frequency, said voltage being in all cases of sufficient magnitude, the device is switched over to pulsed or varying direct voltage of low frequency, with the contacting of the segments not being short-circuited during the phases in which the voltage is zero. This low frequency can be, for example, in the region of 1 Hz or lower, the duration of the switched-on and switched-off phases not needing to be of equal length but instead, for example, it being possible for the switched-off phases to be considerably longer. Since the depth of colour of the displayed information is slow to recede during the current pauses in the non-short-circuited state, relatively short current pulses are sufficient to compensate for these losses again in the subsequent refresh phase. In this way a flicker-free image with virtually constant depth of colour is obtained whose maintenance nevertheless requires only a fraction of the current which would be consumed were the current flow to be permanent.

The UV light absorbers based on the nanoparticles of the invention can be in uniform dispersion in the electrochromic system; for example, in the electrochromic solution. It can also be in uniform distribution in electrochromic layer systems which are located on the conductive layer. Such layers can be applied by knifecoating or poured from solution, in which the nanoparticles are in dispersion and the electrochromic substance in solution or likewise in dispersion. Removal of the solvent then gives an electrochromic layer which includes the nanoparticles. Alternatively, the nanoparticles can be in uniform distribution in a polymer or coating material, the polymer or coating material being applied as a coating to at least one of the two sheets or films.

As a further alternative, the nanoparticles can be present in the sheets or films, especially when these sheets or films consist of a plastic material.

In addition, all of these use forms of the nanoparticles can be combined; in other words, the nanoparticles are present both in the electrochromic system and in one of the described coatings and/or in the sheets or films.

The electrochromic system or one of the described polymer or coating-material coatings or glass plates or plastic plates or films of the electrochromic device comprises the UV light absorber based on the nanoparticles of the invention in a concentration of from 0.001 to 30 atom-%, preferably from 0.01 to 10 atom-%.

Polymers and coating materials can be, for example, polycarbonate, polyurethane, polyester, polyimide, polyamide, acrylates or polyacrylonitrile. The nanoparticles can be incorporated into such materials by customary methods, for example in accordance with WO-A 95/09 895, WO-A 92/21 315 or EP-A 0 628 303.

Specific embodiments of the abovementioned types 1 and 2 can, for example, be the following, which are likewise provided by the invention, if they are protected by nanoparticles against UV light.

Type 1: (Without Mirror Coating)
from the light protection/light filter sector: window panes for, for example, buildings, road vehicles, aircraft, trains, ships, roof glazing, car sunroofs, glazing of greenhouses and conservatories, light filters of whatever kind;
from the safety/secrecy sector: separating screens for, for example, room dividers in, for example, offices, road vehicles, aircraft, trains, see-through protection screens at, for example, bank counters, door glazing, visors for, for example, motorbike or pilots' helmets;
from the design sector: glazing of baking ovens, microwave ovens, other domestic appliances, furniture.

Type 1: (Mirrored)
Mirrors of whatever kind, for example for road vehicles, trains, especially planar, spherical, aspherical mirrors and combinations thereof, e.g. spherical/aspherical, mirror glazing in furniture.

Type 2:
Display devices of whatever kind, for example segmented or matrix displays for, for example, clocks, computers, electrical devices, electronic devices such as radios, amplifiers, televisions, CD players, etc., destination displays in buses and trains, departure displays in railway stations and airports, flat screens, all applications specified under type 1 and 2 which include at least one switchable, static or variable display device, for example separating screens which contain displays such as "Please do not disturb". "Counter unoccupied", or for example car mirrors which include displays of any desired kind, such as displays of the temperature, faults in the vehicle (e.g. oil temperature, open doors), time, direction, etc.

EXAMPLES

Example 1

Figure 1:
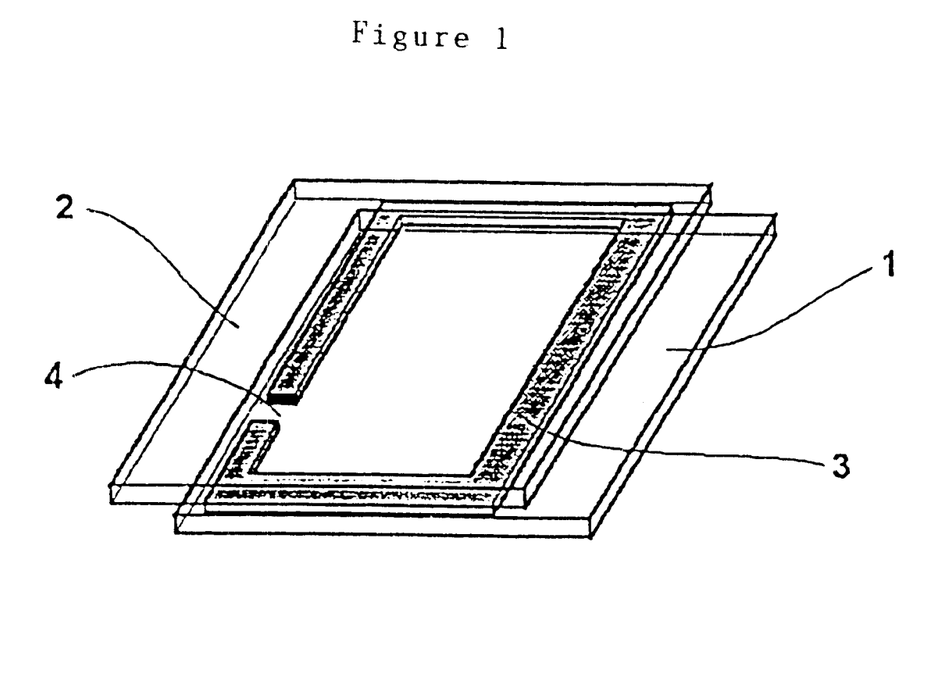
FIG. 1 represents an electrochromic cell constructed for use according to Example 1.

A cell was constructed in accordance with FIG. 1. For this purpose, two glass plates 1 and 2 coated on one side with ITO were used. On the other side they were provided with a layer containing $CeO_2$ nanoparticles. The layer was applied as follows. First a 6% strength by weight polyvinyl alcohol solution and a 7% strength by weight $CeO_2$ dispersion were prepared, each in water. The $CeO_2$ nanoparticies were acquired from Rhodia, Frankfurt, and have a size distribution of 8±2 nm. These solutions were mixed 1:1. This mixture is a 4% strength by weight polyvinyl alcohol solution with a $CeO_2$ fraction which corresponds to 20% by weight, based on the overall solids fraction.

A mixture of 97% of photocuring DELO-Katiobondo 4594 epoxy adhesive (DELO Industrieklebstoffe, Landsberg) and 3% of glass beads having a diameter of 200 μm were applied in the form of a ring 3 to the ITO-coated side of the glass plate 1 in such a way as to leave a 2 mm wide opening 4. The glass plate 2 was then placed on the bead of adhesive in such a way that the ITO layers of the two plates 1 and 2 were facing one another and the geometry shown in FIG. 1 was produced. The adhesive was cured by exposure to daylight for 10 minutes in the vicinity of a window and then for 20 minutes at 105° C. without exposure.

A dish was filled under a nitrogen atmosphere with a solution which was 0.02 molar with respect to the electrochromic compound of the formula (CC)

2 BF$_4^-$ in anhydrous, oxygen-free propylene carbonate.

The cell was then placed vertically in the dish under a nitrogen atmosphere in such a way that the opening 4 was located beneath the level of the liquid. The dish with the cell was placed in a desiccator. This desiccator was evacuated to 0.05 mbar and then carefully aerated with nitrogen. During the aeration, the electrochromic solution rose through the opening 4 into the cell and filled the entire volume apart from a small bubble. The cell was removed from the solution, cleaned at the opening 4 under a nitrogen atmosphere by wiping it with a paper towel, and sealed with the photochemically curable acrylate adhesive DELO-Photobond® (DELO Industrieklebstoffe, Landsberg).

Subsequently, the cell was exposed for 1 minute under a nitrogen atmosphere with a DELOLUX® 03 lamp (DELO Industrieklebstoffe, Landsberg) at a distance of 8 cm from the opening 4 and was cured at room temperature overnight under a nitrogen atmosphere.

Application of a voltage of 0.9 V to the two plates 1 and 2 caused the cell rapidly to turn a deep greenish blue. Switching off the voltage and short-circuiting the contacts caused the colour to disappear again rapidly.

Example 1a

Comparative

A cell was constructed as in Example 1 but using glass plates coated only with ITO.

Light Stability Test

To test the light stability, cells as described in Example 1 together with reference cells as described in Example 1a were exposed at an operating voltage of 0.9 V in a Suntest CPS+ test apparatus from Atlas, Linsengericht-Altenhaβlau, equipped with the dish-shaped filter plate A and using an irradiation power of 765 W/m².

Before the beginning of irradiation, absorption spectra of each cell were recorded in the switched (0.9 V) and in the unswitched (0 V) state using a Cary AG absorption photometer (Varian, Darmstadt). Irradiation took place in intervals which at least double in each case (30 minutes, 1 hour, 2 hours, 4 hours, 8 hours, 16 hours), so that each sample had been irradiated for a total period of 183.5 hours at the end. After each irradiation interval, absorption measurements were again carried out in the switched and unswitched states. These measurements were used to produce the difference spectra, the instantaneous spectra being plotted minus the initial spectra in both the switched and unswitched states.

The damage to the cell was defined by the decrease in the electrochromic swing. This denotes the decrease in the transmission change at a particular wavelength.

The maximum wavelength at 605 nm was evaluated. In evaluating the difference spectra it is necessary to take account of the fact that changes in the transmission in the unswitched state also appear in the difference spectra of the switched state, where they have to be subtracted.

The following table shows the decrease in the electrochromic swing over the cumulative irradiation time for the cell of the invention with nanoparticles (as described in Example 1) and, for comparison, that without nanoparticles (as described in Example 1a).

Comparison with the cells without nanoparticles indicates a strong increase in the stability.

| In % | 0 H | 0.5 h | 1.5 h | 3.5 h | 7.5 h | 15.5 h | 39.5 h | 87.5 h | 183.5 h |
|---|---|---|---|---|---|---|---|---|---|
| Cell with nanoparticles | 100 | 100 | 100 | 100 | 97 | 96 | 88 | 81 | 49 |
| Cell without nanoparticles | 100 | 68 | 49 | 40 | 32 | — | — | — | — |

The damage to the cell (20% less electrochromic swing) was found after 78 hours. In relation to the unprotected state, this denotes an improvement by a factor of 250.

What is claimed is:

1. An electrochromic device comprising
   (a) two plates or films in which the facing sides are provided with an electrically conductive layer, wherein at least one such plate or film is transparent and at least one such conductive layer is transparent,
   (b) a sealing ring joining the plates or films such that the volume formed by the two plates or films and the sealing ring is filled with an electrochromic medium, and
   (c) nanoparticles that are dispersed in the electrochromic system and protect the electrochromic device from UV light.

2. An electrochromic device according to claim 1 wherein at least one of the two conductive layers is coated with an electrochromic layer.

3. An electrochromic device according to claim 1 wherein the electrochromic medium is an electrochromic solution.

4. An electrochromic device according to claim 1 wherein the nanoparticles are present in the electrochromic system and/or have been applied to at least one of the two plates or films and/or have been incorporated into at least one of the two plates or films.

5. An electrochromic device according to claim 1 wherein the nanoparticles are present in a coating applied to at least one of the two plates or films.

6. An electrochromic device according to claim 1 wherein the nanoparticles are incorporated into at least one of the two plates or films.

7. An electrochromic device according to claim 1 wherein the nanoparticles are made of materials based on SiC, AlSi, $Fe_2O_3$, $Fe_3O_4$, $TiO_2$, ZnO, GaP, $CeO_2$, ZnS, $SnO_2$, $Si_yGe_{1-y}$ wherein $0.7 \leq y \leq 1$, $W_xMo_{1-x}O_3$ wherein $0 \leq x \leq 1$, NiO, $Bi_2O_3$, $In_2O_3$, $HfO_2$, $BaTiO_3$, $CaTiO_3$, Ge, AlP, or GaN.

8. An electrochromic device according to claim 1 wherein the nanoparticles are made of materials based on SiC, AlSi, silver halide emulsion layer, $Fe_2O_3$, $Fe_3O_4$, $TiO_2$, ZnO, $CeO_2$, $W_xMo_{1-x}O_3$ wherein $0 \leq x \leq 1$, $BaTiO_3$, or $CaTiO_3$.

9. An electrochromic device according to claim 1 wherein the nanoparticles are predominantly silicon and/or solid compounds in which silicon is present in stoichiometric excess.

10. An electrochromic device according to claim 1 wherein the nanoparticles have an average diameter of less than 500 nm.

11. An electrochromic device according to claim 1 wherein the nanoparticles are spherical or virtually spherical.

12. An electrochromic device according to claim 1 wherein the nanoparticles have a core-shell structure.

13. An electrochromic device according to claim 12 wherein the shell is organically modified.

14. An electrochromic device according to claim 1 wherein the nanoparticles are made of compounds of the formula $Si_xZ_{1-x}$ wherein $0.5 < x \leq 1$ and Z represents C, N, O, Ge, Ca, Ba, Sr, or mixtures thereof.

15. An electrochromic device according to claim 1 wherein the nanoparticles in which silicon is present in stoichiometric excess have a core-shell structure.

16. An electrochromic device according to claim 1 wherein the nanoparticles consist of a core of titanium nitride and a shell of silicon, wherein the silicon proportion by volume is on average at least 30% based on the nanoparticles.

17. An electrochromic device according to claim 1 wherein the nanoparticles have a particle size distribution with a maximum mid-peak width of 40 nm.

18. An electrochromic device according to claim 1 wherein the nanoparticles have an oxide layer covering having a thickness of from 1 to 300 nm.

19. An electrochromic device according to claim 1 wherein the nanoparticles have a shell that is an oxide of the core material or another material that is transparent in the visible range and has a refractive index similar to that of the core of the nanoparticle.

20. An electrochromic device according to claim 1 wherein the nanoparticles are mixed with particles of oxides and/or nitrides of metals that absorb more strongly in the red spectral range of 600 nm<$\lambda$<700 nm than in the blue-green spectral range of 400 nm<$\lambda$<550 nm.

21. An electrochromic device according to claim 20 wherein the additional particles are titanium nitride having an average particle diameter of from 1 to 400 nm or are agglomerates of said titanium nitride particles.

22. An electrochromic device according to claim 20 wherein the additional particles are aluminum sodium silicates.

23. An electrochromic device comprising
   (a) two plates or films in which the facing sides are provided with an electrically conductive layer, wherein at least one such plate or film is transparent and at least one such conductive layer is transparent,
   (b) a sealing ring joining the plates or films such that the volume formed by the two plates or films and the sealing ring is filled with an electrochromic medium, and
   (c) nanoparticles that are incorporated into at least one of the two plates or films and protect the electrochromic device from UV light.

* * * * *